United States Patent [19]
Voller

[11] 4,135,957
[45] Jan. 23, 1979

[54] METHOD FOR SEALING PLASTIC SHEETS

[75] Inventor: Ronald L. Voller, Buffalo Grove, Ill.

[73] Assignee: Vin-Tex Sealers Inc., Itasca, Ill.

[21] Appl. No.: 866,243

[22] Filed: Jan. 3, 1978

Related U.S. Application Data

[63] Continuation of Ser. No. 620,639, Oct. 8, 1975, abandoned.

[51] Int. Cl.$^2$ .................. B29C 27/04; B29D 23/10
[52] U.S. Cl. ........................ 156/157; 93/DIG. 1; 156/218; 156/273; 156/380; 156/581; 219/10.53; 219/10.81
[58] Field of Search ............. 156/73.1, 73.4, 88, 156/157, 217, 218, 273, 380, 502, 580, 580.2, 581, 583; 100/93 P; 219/10.53, 10.81, 10.41; 93/DIG. 1; 53/39, 346, 373, DIG. 2

[56] References Cited

U.S. PATENT DOCUMENTS

| | | | |
|---|---|---|---|
| Re. 27,759 | 9/1973 | Leimert | 156/273 |
| 2,631,646 | 3/1953 | Gannon et al. | 53/39 X |
| 3,236,174 | 2/1966 | Hutchinson et al. | 156/583 X |
| 3,528,876 | 9/1970 | Von Claue-Bouhaben et al. | 156/218 |
| 3,791,908 | 2/1974 | Gidge | 156/273 |
| 3,809,596 | 5/1974 | Gidge | 156/380 |
| 3,817,816 | 6/1974 | Watt | 156/583 |
| 3,826,702 | 7/1974 | Chapman | 156/218 X |
| 3,960,636 | 6/1976 | Moffitt | 156/290 |
| 3,986,914 | 10/1976 | Howard | 93/DIG. 1 X |

Primary Examiner—Michael G. Wityshyn
Attorney, Agent, or Firm—McDougall, Hersh & Scott

[57] ABSTRACT

A method and apparatus are disclosed for sealing flexible plastic sheets together. The method is performed by use of a die wherein a pair of longitudinal grooves are provided at the edge of the sealing area. The die is connected to a source of radio frequency energy and the sheets are placed between the die faces to effect the seal. Due to the provision of the grooves the sealing is effected without the extrusion of material into the space between the sheets thereby to produce a stronger and more satisfactory bond.

4 Claims, 3 Drawing Figures

METHOD FOR SEALING PLASTIC SHEETS

This is a continuation of application Ser. No. 620,639, filed Oct. 8, 1975, now abandoned.

BACKGROUND OF THE INVENTION

This invention relates to the field of heat sealing. More specifically, it relates to the field of heat sealing plastic sheets such as polyvinyl chloride and like materials along their ends. This is sometimes referred to as an overlap seal by which the end of one sheet is joined to the end of a second sheet in order to form various products.

In the prior art it is known to seal two sheets of flexible plastic material by the use of sealing dies which apply pressure and radio frequency energy. The pressure on the sheets produces intimate surface contact while the radio frequency energy effects dielectric heat sealing in a manner well known in the art.

A particular problem with this method of heat sealing sheets of flexible plastic is the weakness of the sheets in the region of the seal. Often in the prior art the sealing process causes the seal or the areas adjacent the seal to become thinner than the gauge of a single sheet of plastic in spite of the fact that two sheets are overlapped in this area. This may be due to the extrusion of the heated material away from the area of the seal due to the application of pressure by the dies. As indicated in FIG. 2 of the drawings, this extrusion of material forms between the sheets which are being sealed together.

In certain applications it is necessary that the seals between sheets of plastic be as strong as or stronger than the material itself.

It is accordingly an object of the present invention to provide a method of sealing two sheets of flexible plastic together in a manner which avoids extrusion of material between the sheets adjacent the sealed area.

It is another object of the present invention to provide an improved sealing die which can produce a seal which is as strong as or stronger than a single sheet of the material being sealed.

It is a further object of the present invention to provide a means for dielectrically sealing at least two sheets of flexible plastic material together with negligible extrusion of material between the sheets.

Other objects and advantages of the invention will be apparent from the remaining portion of the specification.

DETAILED DESCRIPTION

Figure 2:
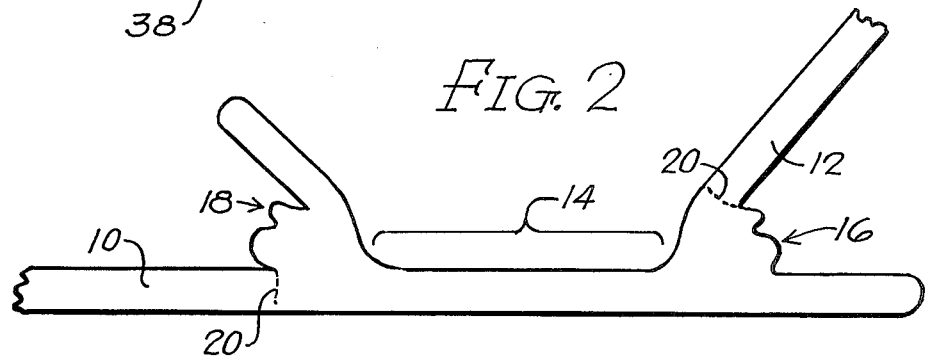
FIG. 2 is an illustration of the type of seal produced by prior art dies.

Referring to FIG. 2, the type of seal produced by dies known in the art is illustrated. In FIG. 2 a first sheet 10 of a plastic material such as polyvinyl chloride has been sealed to a second sheet 12. In this case the seal is shown as being in the vicinity of the edges of the sheets. The seal is produced by applying pressure to the overlapping area 14 while at the same time applying radio frequency energy as, for example, radio frequency energy in the range of 27 MHz. The radio frequency energy produces a dielectric heat seal, i.e., it heats the plastic molecules causing them to bond together.

Due to the pressure applied as the plastic is heated, a quantity of material from each of the sheets becomes sufficiently fluid that it is displaced or extruded to the areas indicated at 16 and 18 located between the two sheets on either side of the sealing area 14. This type of seal has been found to be weaker in tension than either sheet 10 or 12 alone. Thus, if tension is applied across sheets 10 and 12, in all likelihood a break will occur in the area indicated by numeral 20 or adjacent thereto. This is due to an effect known as cross graining which is in large part attributable to the extrusion and to the fact that the applied pressure over the area 14 reduces the thickness of the material to a gauge less than the original gauge of either sheets 10 or 12.

Figure 1:
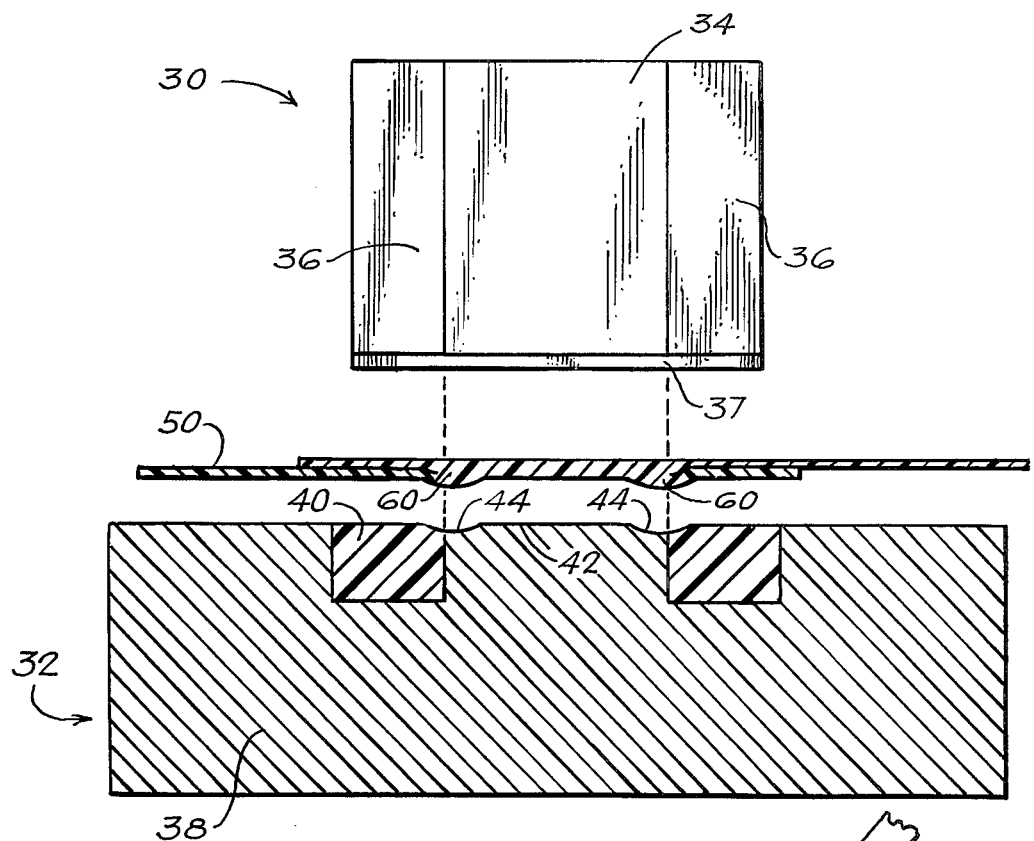
FIG. 1 is a side elevation of a two piece die for sealing plastic sheets according to an embodiment of the invention.

Referring now to FIG. 1, a dielectric heat sealing die according to the present invention is illustrated. This die substantially eliminates the extrusion of material between the sheets of plastic material which are to be sealed. The die consists of an upper section 30 and a lower section 32. The upper section is comprised of a central portion 34 which is preferably formed of brass or other conductor and serves as a radio frequency electrode. Provided on either side of the electrode 34 and on the bottom thereof is insulating material 36 and 37 such as Bakalite or other phenolic insulating material. The insulator 37 applied across the bottom of the electrode serves as a heat shield for the upper die while the side insulators serve to limit the area of radio frequency energy thereby to determine the size of the seal.

The lower die section comprises an electrode 38 which may be formed of brass and has two inset insulator sections 40 on either side of the sealing area 42. It will be observed that the upper insulators 36 are in alignment with the lower insulators 40.

Of great importance to the present invention is the provision of relief grooves 44 at the edge of the sealing area 42, said grooves extending into the beginning of the insulators 40. As will be explained, these relief grooves prevent the formation of the extruded material between the sheets as occurs in the prior art.

In the present invention and in prior art devices the usual sequence in order to effect a seal is as follows. The sheets to be sealed are placed between the die sections and the sections are then brought together to compress the sheets and apply the radio frequency energy to the seal area. In the present invention, however, the relief grooves 44 provided at the edge of the sealing area prevent the die sections from applying substantial pressure to the sheets at the edge of the seal. It will be appreciated, however, that once past the grooves 44 the die sections will again apply pressure to the sheets. However, outside the sealing area no radio frequency energy is applied to the sheets and thus while they are subjected to die pressure they are not heated.

Figure 3:
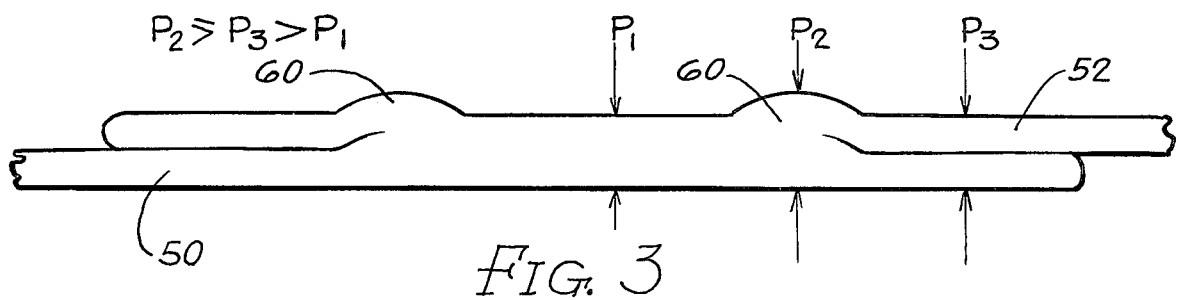
FIG. 3 is an illustration of the seal produced by the die of FIG. 1.

Referring to FIG. 3, the effect of this on the sheets is indicated by the arrows and the letters P1, P2 and P3. As indicated by the relationship in the left hand corner of FIG. 3, the pressure applied to the area of the seal, P1, is greater than the pressure, P2, applied in the area of the relief grooves 44. The pressure applied to the sheets outside the sealing area, P3, may be less than or equal to the pressure in the area of the seal.

The effect of this arrangement is to cause the extrusion of material during sealing to flow into the relief channels 44 where it serves to increase the thickness of the sheets adjacent the seal. As indicated in FIG. 3, the sheets in the area adjacent the seal have a thickness greater than the thickness of the two sheets added together. This produces a strength increase in the area adjacent the seal with the result that the seal has a tensile strength on the order of 90 to 100 percent of the tensile strength of the individual sheets. In the prior art a typical tensile strength in the area adjacent a seal is in the range of 60 to 70 percent.

The method employed in the present invention may be briefly summarized as follows. The sheets to be bonded as, for example, sheets 50 and 52, are placed between the upper and lower die sections 30 and 32. The die sections are then brought together applying pressure to the sheets in the manner indicated in FIG. 3. Radio frequency energy is then applied to the electrodes 34 and 38 to produce a dielectric heat seal in the sealing area 42. As the sheets get hot, extrusion begins due to the pressure of the die in the area 42. The material which flows moves outwardly toward the relief grooves 44. That is, from an area of higher pressure to an area of lower pressure. Upon reaching the relief grooves 44, it forms the thickened areas 60.

The extruded material does not pass beyond the relief grooves because the pressure therebeyond is approximately as great as the pressure in the sealing area. In effect, the extruded material is pinched between the two higher pressure areas, P1 and P3, of the die. After a sufficient sealing time has elapsed, the RF energy is shut off, the material is allowed to cool and the dies are separated.

In the embodiment illustrated it is contemplated that longitudinal lap seaming will be accomplished, that is, a linear seal near the edge of two sheets in order to produce a larger combined sheet. It is contemplated that by utilizing other dies having relief grooves of various depths and widths and having various configurations such as linear, circular, or otherwise, sheet sealing according to any desired pattern can be accomplished. For example, a circular seal may be produced. It is also contemplated to employ the present invention to seal more than two sheets. It is only necessary to modify the die pressure, dimensions of the grooves, and the time RF energy is applied depending upon the gauge of the material, the number of sheets, etc.

While I have shown and described embodiments of this invention in some detail, it will be understood that this description and illustrations are offered merely by way of example, and that the invention is to be limited in scope only by the appended claims.

I claim:

1. A method of sealing together portions of at least two flexible plastic sheets without substantial extrusion of material between said sheets comprising the steps of:
    (a) overlying the sheets on a flat surface having a pair of spaced recessed grooves which define therebetween the seal area of the sheets,
    (b) simultaneously compressing the sheets onto said surface over the entire seal area and on both sides thereof,
    (c) heating the sheets simultaneously with step (b) only in the seal area to extrude material from the seal area into said grooves to form a seal having strengthened edges which conform to the configuration of said grooves and which strengthened edges have a thickness greater than the combined thickness of the overlying sheets.

2. The method according to claim 1 wherein said recessed grooves are semi-circular in configuration.

3. The method of claim 1 wherein the step of heating includes applying radio frequency energy to said sheets.

4. A method of sealing the ends of one flexible plastic sheet to form a tube comprising the steps of:
    (a) overlapping the ends of said sheet on a flat surface having a pair of spaced recessed grooves which define therebetween the seal area,
    (b) simultaneously compressing the ends of said sheet onto said surface over the entire seal area and on both sides thereof,
    (c) heating the ends of said sheet simultaneously with step (b) only in the seal area to extrude material from the seal area into said grooves to form a seal having strengthened edges which conform to the configuration of said grooves and which strengthened edges have a thickness greater than the combined thickness of the overlapping ends of said sheet.

* * * * *